Figure 1:
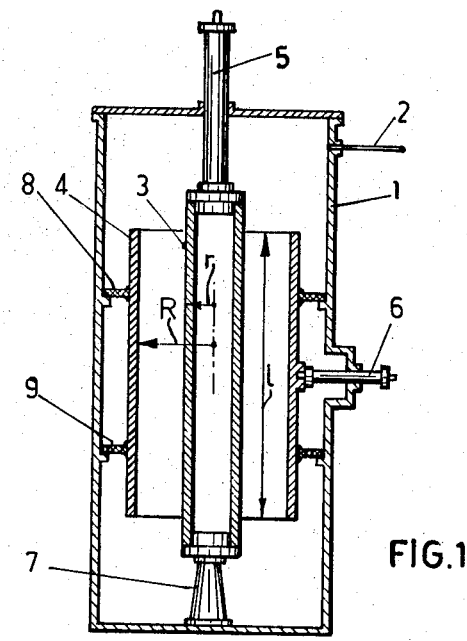

United States Patent

Boersma et al.

[15] 3,646,412
[45] Feb. 29, 1972

[54] CYLINDRICAL CAPACITORS WITH GAS DIELECTRICS

[72] Inventors: Rintje Boersma, Harmelen; Huibert A. J. M. Spoorenberg, Utrecht, both of Netherlands

[73] Assignee: N. V. "COQ", Utrecht, Netherlands

[22] Filed: Oct. 23, 1969

[21] Appl. No.: 868,763

[30] Foreign Application Priority Data

Mar. 20, 1969 Netherlands..........................6904281

[52] U.S. Cl..............................317/244, 317/247, 317/258
[51] Int. Cl. .......................................................H01g 3/02
[58] Field of Search ..........................317/242, 244, 247, 258

[56] References Cited

UNITED STATES PATENTS

| 792,443 | 6/1905 | Morwitz...............................317/242 |
|---|---|---|
| 1,422,312 | 7/1922 | Smith...................................317/244 |
| 1,545,207 | 7/1925 | Smith...................................317/244 |
| 1,610,980 | 12/1926 | Silberman.............................317/242 |
| 1,881,164 | 10/1932 | Bailey...................................317/242 |
| 2,271,983 | 2/1942 | Larue..............................317/247 X |

OTHER PUBLICATIONS

The Condensed Chemical Dictionary Sixth Edition Reinhold 1963 p. 1093.

Primary Examiner—E. A. Goldberg
Attorney—Imirie, Smiley, Snyder & Butrum

[57] ABSTRACT

In a cylindrical capacitor having a gaseous dielectricum the relation between the coefficient of expansion of the material of the inner cylinder of the capacitor and the gas pressure, which is held steady, being such as to make the capacity of the capacitor substantially independent of temperature variations within the operational temperature range of the capacitor.

7 Claims, 2 Drawing Figures

PATENTED FEB 29 1972

3,646,412

INVENTORS
RINTJE BOERSMA
HUIBERT A. J. M. SPOORENBERG

BY *Imirie, Smiley, Snyder & Butrum*
ATTORNEYS

CYLINDRICAL CAPACITORS WITH GAS DIELECTRICS

The invention relates to a cylindrical capacitor for high voltage having a gaseous dielectricum.

In switchgear for high voltages not only voltage transformers but also capacitive voltage dividers are used for measuring purposes. Such devices are safer for direct connections with the live conductors and they occupy considerably less room than voltage transformers. Capacitive voltage dividers can be provided with resonance circuits or with amplifiers. The voltage dividers provided with resonance circuits are highly dependent on frequency variations in the network, so that they are suitable for less accurate measurements only. The capacitive voltage dividers provided with amplifiers have the disadvantage that the transmission ratio of the capacitor circuit is dependent on the temperature which is highly variable in switchgear, say from $-20°C.$ to $+80°C.$ The invention has the object to provide a cylindrical capacitor which is suitable for use in capacitive voltage dividers provided with amplifiers or other circuits for accurate measurements and in which, due to special measures, the capacity variation within the interesting temperature range remains below the value of 0.1 percent required for accurate measurements. This is achieved in that at a chosen reference temperature the ratio between the radius of the inner electrode surface of the outer cylinder of the capacitor and the radius of the outer electrode surface of the inner cylinder of the capacitor is equal to the base $e$ of the natural logarithm, whereas the inner cylinder consists mainly of material having such a linear coefficient of expansion and the pressure of the gaseous dielectricum is kept constant or substantially constant at such a value as to ensure that $$\alpha = \frac{kpT_o}{T_1T_2 + kpT_o^2}$$

in which $\alpha$ is said coefficient of expansion, $k$ is a material constant of the gas per atmosphere of the pressure, $p$ is said pressure in atmospheres and $T_o$ is said reference temperature in Kelvin degrees and in which $T_1$ and $T_2$ are the extreme temperatures in K. degrees of a temperature range which is equal or lies within the temperature range, in which the temperature of the capacitor is apt to vary during normal operation.

The meaning of the conditions stated here above will appear from the following calculation.

The capacity of a cylindrical capacitor is:

$$C = \frac{2\pi \sum_o \sum_r 1}{\ln \frac{R}{r}}$$

Therein is $\Xi_o$ the dielectric constant of a vacuum, $\Xi_r$ the dielectric constant of the gaseous dielectricum and 1 the length, R the radius of the inner electrode surface of the outer cylinder and r the radius of the outer electrode surface of the inner cylinder of the capacitor. The quantities $\Xi_r$, 1, R and r are dependent on the temperature T.

The variation of $\Xi_r$ depends, according to a relationship which will be given hereafter, on the variation of the density $\sigma$ of the gas. If the pressure $p$ in the capacitor must be held steady, gas will have to be discharged from the capacitor vessel, when the temperature rises, and gas will have to be supplied to the capacitor vessel, when the temperature falls. In the first case the density and the dielectric constant decrease and in the second case these quantities increase. In each situation $$\frac{pv}{T}$$

is constant and since the density $\sigma$ is inversely proportional to the specific volume $v$. also $\sigma T$ will be constant. Assuming the density $\sigma_o$ to belong to the chosen reference temperature $T_o$ the density $\sigma$ will be defined at any other temperature T by $$\sigma = \frac{T_o}{T} \sigma_o.$$

The dielectric constant of a gas is defined by the equation:

$$\sum_r = 1 + k \frac{\sigma}{\sigma_o} p \text{ or } \sum_r = 1 + \frac{kT_o}{T} p \ldots \quad (1)$$

Therein is $k$ a constant of the material per atmosphere of the pressure, $T_o$ the chosen reference temperature in K. degrees and $p$ the pressure of the gas in atmospheres, said pressure being held steady.

At a variation of the temperature the dimension of the and distance between the capacitor electrodes vary. The influence of these variations on the capacity of the capacitor will appear from the following calculation.

If the capacitor has, at the reference temperature $T_o$, a length $l_o$, an outer radius $R_o$ and an inner radius $r_o$, one will find at the temperature T that:

$$l = l_o[1+\alpha_1(T-T_o)]$$
$$R = R_o[1+\alpha_1(T-T_o)]$$
$$r = r_o[1+\alpha_2(T-T_o)]$$

Therein are $\alpha_1$ and $\alpha_2$ the linear coefficients of expansion of the material of the outer cylinder and the material of the inner cylinder. Furthermore it is assumed that the length of the capacitor is defined by the outer cylinder only. If $T-T_o=\Delta T$, the capacity of the capacitor will be at the temperature T:

$$C = \frac{2\pi \sum_o \sum_r l_o(1+\alpha_1\Delta T)}{\ln \frac{R_o(1+\alpha_1\Delta T)}{r_o(1+\alpha_2\Delta T)}} \ldots \quad (2)$$

The capacitor is so constructed that at the reference temperature $T_o$ the ratio between $R_o$ and $r_o$ is equal to the base e of the natural logarith, so that $$\ln \frac{R_0}{r_0} = 1.$$

The denominator of equation 2) will then be $1+\ln(1-\alpha_1\Delta T)-\ln(1+\alpha_2\Delta T)$. If $\alpha_1\Delta T$ and $\alpha_2\Delta T$ are small in respect of 1, it may be assumed that $\ln(1+\alpha_1\Delta T) = \alpha_1\Delta T$ and $\ln(1+\alpha_2\Delta T) = \alpha_2\Delta T$. If these values are entered in equation 2), one will find that $$C = \frac{2\pi \sum_o \sum_r l_o(1+\alpha_1\Delta T)}{1+\alpha_1\Delta T - \alpha_2\Delta T}$$

or $$C = \frac{2\pi \sum_o \sum_r l_o(1+\alpha_1\Delta T)(1-\alpha_1\Delta T+\alpha_2\Delta T)}{1-(\alpha_1\Delta T-\alpha_2\Delta T)^2}$$

Since $\alpha_1\Delta T$ and $\alpha_2\Delta T$ are small in respect of 1, all square powers thereof may be neglected, so that equation 2) changes into:

$$C = 2\pi\Xi_o\Xi_r l_o(1+\alpha_2\Delta T)$$

or $$C = 2\pi\Xi_o\Xi_r l_o[1+\alpha_2(T-T_o)] \ldots \ldots 3)$$

If equation 1) is inserted in equation 3) one will find that:

$$C = 2\pi \sum_o l_o\left(1+\frac{kT_op}{T}\right)\{1+\alpha_2(T-T_o)\} \ldots \quad (4)$$

It follows therefrom that the expansion of the outer cylinder has a negligible effect on the capacity of the capacitor and that, as a consequence thereof, only the material of the inner cylinder has to be reckoned with.

The invention has the object to choose such a gas pressure $p$ and a material for the inner cylinder with such a linear coefficient of expansion $\alpha_2$ that a capacitor is obtained, of which, even when the capacitor is used for accurate measurements, the capacity varies negligibly, when the temperature varies within the temperature range found in normal operation and the gas pressure varies with-in the range defined by the sensitivity of the device for holding the gas pressure steady.

Since at a variation of the temperature T the value of the term $$1+\frac{kT_op}{T}$$

varies along a curve and the value of the term $1 + \alpha_2(T_1-T_o)$ varies linearly an exact compensation can be obtained at two temperatures $T_1$ and $T_2$ of the interesting temperature range only. If these temperatures $T_1$ and $T_2$ have been selected the relation between the coefficient of expansion $\alpha_2$ and the gas pressure p will be found by means of the equation:

$$\left(1 + \frac{kT_op}{T_1}\right)\{1 + \alpha_2(T_1 - T_o)\} = \left(1 + \frac{kT_op}{T_2}\right)\{1+\alpha_2(T_2-T_o)\}$$

or
$$\alpha_2 = \frac{kpT_o}{T_1T_2 + kpT_o^2} \quad \cdots \quad (5)$$

or
$$p = \frac{\alpha_2 T_1 T_2}{kT_o(1 - \alpha_2 T_o)} \quad \cdots \quad (6)$$

The greatest errors are made, if the temperatures $T_1$ and $T_2$ are the extreme temperatures of the interesting temperature range. Smaller errors are possible, if the temperatures $T_1$ and $T_2$ lie in given points within said temperature range, said points being not calculated more fully, The capacitor constructed in accordance with the invention is especially meant for use in the mentioned voltage dividers, which are particularly adapted for measurements in high-voltage switchgear. In such switchgear the temperature is able to vary between $-20°$ C. and $+80°$ C., so that the interesting temperature range extends from $253°$ to $353°$ K. If the gas in the capacitor is air, the constant $k$ has, at the reference temperature $T_o=293°$ K., the value of $5.5 \cdot 10^{-4}$ per atmosphere of the pressure. If the inner cylinder of the capacitor is made of aluminum, the coefficient of expansion $\alpha_2$ is equal to $24 \cdot 10^{-6}$ per °C. It then follows from equation 6) that the gas pressure p must have the value of 13.4 atmospheres, if it is required that the capacitor has, at $253°$ K., the same capacity as at $353°$ K.

If $\alpha_2=24 \cdot 10^{-6}$ and $p = 13.4$ atmospheres, the capacity of the capacitor at the temperatures $T_1=253°$ K. and $T_2=353°$ K. can be calculated with the aid of equation 4). Said capacity is found to be: $C = 2\pi \Xi_o l_o \cdot 1,00757$.

At a temperature lying between the extreme temperatures $T_1$ and $T_2$ the compensation is not exact. For instance at the temperatures $T=**°$ K. and $T=313°$ K. it is found that:

$$C_{(293)} = 2\pi\Xi_o l_o \cdot 100,737$$
$$C_{(313)} = 2\pi\Xi_o l_o \cdot 100,737$$

Thus the error on a percentage basis is both at $T = 293°$ K. and at $T=313°$ K. about equal to $$\frac{1,00737 - 1,00757}{1,00757} \cdot 100\% = -0,02\%.$$

This error occurs if the pressure is held exactly steady. However, the pressure controlling device has a certain sensitivity, so that the pressure of the gas will vary within a given range. Assuming the pressure to be allowed to vary from 12.4 to 14.4 atmospheres, the capacity will be at say $T= 299°$ K.

$$C_{(299°K, 12.4\ ato)} = 2\pi\Xi_o l_o \cdot 100,683$$
$$C_{(299°K, 14.4\ ato)} = 2\pi\Xi_o l_o \cdot 100,791$$

The error at a percentage basis will then be at 12.4 atmospheres about $\frac{1,00683 - 1,00757}{1,00757} \cdot 100\% = -0,0734\%$ and at 14,4 atmospheres about $\frac{1,00791 - 1,00757}{1,00757} \cdot 100\% = +0,0337\%$

At $T = T_2 = 353°$ K. and $p = 14.4$ atmospheres the capacity will be:
$C = 2\pi\Xi_o l_o \cdot 100,802$ The error on a percentage basis will then be about $$\frac{1,00802 - 1,00757}{1,00757} \cdot 100\% = +0,045\%.$$

None of these errors appear to be more than 0.1 percent, so that the capacitor is adapted to be used for measurements for which an accuracy of 0.1 percent is required.

If, in order to obtain a greater strength against rupture or to be able to decrease the radial dimension of the capacitor, a higher air pressure, say a pressure of 20 atmospheres, has to be used in the capacitor a material having an other coefficient of expansion $\alpha_2$ must be used for the inner cylinder of the capacitor. This coefficient of expansion is determined by equation 5) and it will be $35.7 \cdot 10^{-6}$. Then the inner cylinder may be made of synthetic resin, of which the outer surface is provided with a metal layer forming the capacitor electrode.

In stead of air an other gas, e.g., sulfur-hexafluoride ($SF_6$-gas) may be used in the capacitor. This gas, which is used in switchgear for very high-voltages, has a great strength against rupture, but it condenses at the prevailing temperatures at rather low pressure. If the temperature can fall, as in the former case, to $-20°$ C. the pressure may not be higher than 4 atmospheres, since otherwise condensation will occur. The constant k of $SF_6$-gas is $2.3 \cdot 10^{-3}$ per atmosphere of the pressure. If a gas pressure $p$ of 2 atmospheres or of 4 atmospheres is used, one will find with the aid of equation 5) for the coefficient of expansion $\alpha_2$ of the material of the inner cylinder of the capacitor:

$$\alpha_2 = 1503 \cdot 10^{-6}$$
$$\alpha_2 = 2992 \cdot 10^{-6}$$

In the first case said inner cylinder may be made of a copper alloy and in the second case of a metallized synthetic resin, e.g., cast resin.

However, if the inner cylinder is made of aluminum having a coefficient of expansion $\alpha_2 = 24 \cdot 10^{-6}$ and if the dielectricum consists of $SF_6$-gas, the required pressure is calculated with the aid of equation 6). One then finds that $p$ is about 3.2 atmospheres.

It can be calculated that also in the considered cases, in which the dielectricum of the capacitor consists of $SF_6$-gas, the variation of the capacity due to a variation of the temperature within the interesting temperature range from $253°$ to $353°$ K. and to a variation of the pressure within the sensitivity range of the device for holding the pressure steady will remain below 0.1 percent, so that also such a capacitor can be used in a capacitive voltage divider for accurate voltage measurements.

Figure 2:
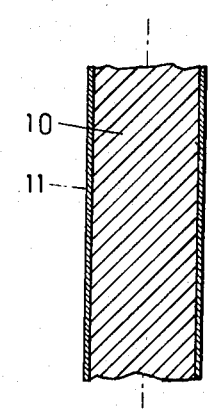

The drawing shows,

FIG. 1 an axial sectional view of a cylindrical capacitor constructed in accordance with the invention and, FIG. 2 on a larger scale an axial sectional view of a part of a differently formed inner cylinder of such a capacitor.

In FIG. 1 the reference numeral 1 designates a closed vessel which is filled with an insulating gas under overpressure. The vessel 1 is connected to a conduit 2 leading to a device (not shown) to hold the pressure of said gas steady. Mounted in the vessel is a cylinder capacitor which consists of an inner cylinder 3 and an outer cylinder 4. At least the outer surface of the inner cylinder and at least the inner surface of the outer cylinder are electrically conductive. A conductor with bushing insulator 5 is provided for the electric connection of the inner cylinder 3 and a conductor with bushing insulator 6 is provided for the electric connection of the outer cylinder 4. The inner cylinder 3 is supported by the bushing insulator 5 and a supporting insulator 7 and the outer cylinder 4 is carried by welded collar rings 8, 9.

At the reference temperature $T_o$, which may be $20°$ C. ($293°$ K.) the ratio between the inner radius $R$ of the outer cylinder 4 and the outer radius $r$ of the inner cylinder 3 is equal to the base $e$ of the natural logarithm, that means about 2,718.

In the embodiment shown in FIG. 2 the inner cylinder 10 consists of synthetic resin, e.g., cast resin, of which the outer surface is provided with a thin electrically conductive layer 11, e.g., is metallized.

What we claim is:

1. A cylindrical capacitor for high voltage and which may be subjected to temperature variations over a specified temperature range during normal operation, comprising a hollow outer cylinder, an inner cylinder mounted concentrically in said outer cylinder and a gaseous dielectric, at least the inner surface of the outer cylinder and at least the outer surface of the inner cylinder being electrically conductive and constituting the electrodes of the capacitor, the ratio between the radius of the inner surface of the outer cylinder and the radius of the outer surface of the inner cylinder being, at a given reference temperature $T_o$, equal to the base e of the natural logarithm, the linear coefficient of expansion $\alpha$ of the main substance of the inner cylinder and the pressure $p$, at which the gaseous dielectric is held substantially steady, being selected to provide equal capacitances at temperatures $T_1$ and $T_2$ which are within said temperature range and being given by the equation $$\alpha = \frac{kpT_o}{T_1T_2 + kpT_o^2}$$

in which $\alpha$ is said coefficient of expansion, $k$ is a constant of the substance of the gas per atmosphere of the pressure of the gas, $p$ is said pressure in atmospheres, $T_o$ is said reference temperature in K. degrees and said temperatures $T_1$ and $T_2$ are in K. degrees.

2. A cylindrical capacitor as claimed in claim 1, in which the inner cylinder consists mainly of aluminum and the dielectric consists of air.

3. A cylindrical capacitor as claimed in claim 1, in which the inner cylinder consists mainly of synthetic resin, an electrically conductive surface layer forming the inner electrode of the capacitor being provided on said inner cylinder, and in which the dielectric consists of air.

4. A cylindrical capacitor as claimed in claim 1, in which the inner cylinder consists mainly of synthetic resin, an electrically conductive surface layer forming the inner electrode of the capacitor being provided on said inner cylinder, and in which the dielectric consists of sulfur-hexafluoride ($SF_6$—gas).

5. A cylindrical capacitor as claimed in claim 1, in which the inner cylinder consists mainly of aluminum and the dielectric consists of $SF_6$—gas.

6. A cylindrical capacitor as claimed in claim 1, in which the inner cylinder consists of a copper-alloy and the dielectric consists of $SF_6$—gas.

7. A cylindrical capacitor for high voltage, which capacitor provides relatively constant capacitance over a temperature range to which the capacitor may be subjected, comprising;
a hollow outer cylinder having at least an inner electrically conductive surface of uniform radius R constituting one electrode of the capacitor;
an inner cylinder mounted in said outer cylinder and having at least an outer electrically conductive surface of uniform radius r constituting the other electrode of the capacitor and which is concentrically spaced with respect to said inner surface;
the space between said electrodes being filled with a gaseous dielectric maintained at a substantially constant, selected pressure $p$;
the ratio, $$\frac{R_o}{r_o},$$

of the radii of said inner and outer surfaces at a reference temperature $T_o$, which is within said temperature range, being equal to the base e of natural logarithms whereby values of capacitance of said capacitor are substantially independent of dimensional changes of said outer cylinder due to variations in temperature to which said capacitor may be subjected; and
said value of p and the coefficient of expansion of the main substance of said inner cylinder being selected to provide equal capacitances between said electrodes at temperatures $T_1$ and $T_2$ which are respectively above and below said reference temperature $T_o$ and are in said temperature range.

* * * * *